US005754179A

United States Patent [19]

Hocker et al.

[11] Patent Number: 5,754,179
[45] Date of Patent: May 19, 1998

[54] SELECTION FACILITATION ON A GRAPHICAL INTERFACE

[75] Inventors: Michael David Hocker, Staatsburg; Clifford Alan Pickover, Yorktown Heights, both of N.Y.; Daniel James Winarski, Tucson, Ariz.

[73] Assignee: International Business Machines Corporation, Armonk, N.Y.

[21] Appl. No.: 476,530

[22] Filed: Jun. 7, 1995

[51] Int. Cl.⁶ .................................................. G06F 3/14
[52] U.S. Cl. .................................................. 345/348
[58] Field of Search .................... 395/159, 155, 395/161, 335, 339, 348, 334, 346, 356, 349

[56] References Cited

U.S. PATENT DOCUMENTS

| | | | |
|---|---|---|---|
| 5,040,131 | 8/1991 | Torres | 395/348 X |
| 5,448,693 | 9/1995 | Blades et al. | 395/348 |
| 5,539,479 | 7/1996 | Bertram | 348/564 |
| 5,564,004 | 10/1996 | Grossman et al. | 395/348 |

FOREIGN PATENT DOCUMENTS

| | | |
|---|---|---|
| 480 859 A2 | 4/1992 | European Pat. Off. . |
| 677 803 A2 | 10/1995 | European Pat. Off. . |

OTHER PUBLICATIONS

"Drag and Drop Target Indicator", Research Disclosure, No. 341, Emsworth, GB, p. 711, Sep. 1992.
"Smart Application Selection Assistant", IBM Technical Disclosure Bulletin, vol. 38, No. 2, pp. 353–354, Feb. 1995.
European Search Report, App. No. EP 96 10 7834, Sep. 1996.

*Primary Examiner*—Mark R. Powell
*Assistant Examiner*—Crescelle N. dela Torre
*Attorney, Agent, or Firm*—Whitham, Curtis & Whitham; Louis J. Percello

[57] ABSTRACT

This invention allows the user to rapidly determine the interrelatedness of icons on graphical user interfaces. Upon selection of an icon, for example in a drag-and-drop interface, all other icons to which the selected icon may be related are graphically highlighted. This provides a user-friendly, dynamic, visual catalog of interrelated icons. A scenario matrix contains information that defines the relations among the icons on the graphical interface.

19 Claims, 4 Drawing Sheets

SELECTION FACILITATION ON A GRAPHICAL INTERFACE

FIELD OF THE INVENTION

This invention relates to computer graphical user interfaces. More specifically, the invention relates to a graphical user interface (GUI) allowing users to better understand the relationship between icons displayed on a computer screen.

BACKGROUND OF THE INVENTION

Graphical user interfaces (GUIs) provide ways for users of computers and other devices to effectively communicate with the computer. In GUIs, available applications and data sets are often represented by icons consisting of small graphical representations which can be selected by a user and moved on the screen. The selection of icons often takes the place of typing in a command using a keyboard in order to initiate a program. In general, icons are tiny on-screen symbols that simplify access to a program, command, or data file. Icons are usually activated or selected by moving a mouse-controlled cursor onto the icon and pressing a mouse button.

GUIs include graphical images on computer monitors and often consist of both icons and windows. (GUIs may also reside on the screens of televisions, kiosks, and automatic teller machines (ATMs).) A computer window is a portion of the graphical image that appears on the monitor and is dedicated to some specific purpose. Windows allow the user to treat the graphical images on the computer monitor like a desktop where various files can remain open simultaneously. The user can control the size, shape, and position of the windows.

Although the use of GUIs with icons usually simplifies a user's interactions with a computer, GUIs are often tedious and frustrating to use. Icons must be maintained in a logical manner. It is difficult to organize windows and icons when many are similarly displayed at the same time on a single device.

In a drag-and-drop GUI, icons are selected and moved to a target icon to achieve a desired effect. For example, an icon representing a computer file stored on disk may be dragged over an icon containing an image of a printer in order to print the file, or dragged over an icon of a trash can to delete the file. A typical user's screen contains many icons, and only a subset of them will at any one time be valid, useful targets for a selected icon. For example, it would not be useful to drag the icon representing a data file on top of an icon whose only purpose is to access an unrelated multimedia application.

OBJECTIVES OF THE INVENTION

An objective of this invention is an improved system and method for organizing and using graphical displays on graphical interfaces.

Another objective of this invention is an improved system and method for organizing, displaying, managing, and selecting icons and/or windows on a computer graphical interface.

SUMMARY OF THE INVENTION

This invention permits users to conveniently view and manipulate related GUI icons, particularly in a drag-and-drop interface but also in any presentation where information on the relatedness of icons and/or windows is desired. In a preferred embodiment, when one icon/window is selected and/or dragged, other related icons are then distinguished by one of a plurality distinguishing features, such as by brightening, by rounded corners, or by an oval shape and/or highlighted text. (Note that in this disclosure, "distinguishing feature" and "highlight" are used interchangeably.) This distinguishing allows the user to see and understand which icons are related to the target icon, thus creating an interactive visual index for the user and/or guiding the user to specific targets (drop sites) in drag-and-drop interface. Icons are related when they represent data, functions, and/or programs that can be used together. The user can also specify which icons are related, e.g., those in a similar class like office applications, word processing, or drawings. Strength of the relationship can also be indicated by factors such as icons being most frequently used or recently used together.

DETAILED DESCRIPTION OF THE INVENTION

This invention permits users to conveniently view, organize, use, and understand relationships between GUI objects including icons with static or animated graphics, text, multimedia presentations, and TV broadcasts. GUI objects could also include three dimensional images, for example, those used in virtual reality applications. When one data object or program, having a discrete graphical appearance on the GUI, is selected or dragged, target icons are highlighted. Generally, but not necessarily, the highlighting lasts for a time period limited to the time the original data object is selected/dragged. The highlighting is used to make the user aware that a relation exists between the highlighted icons. Further the highlights are used to guide the user toward appropriate target icons.

Figure 1:
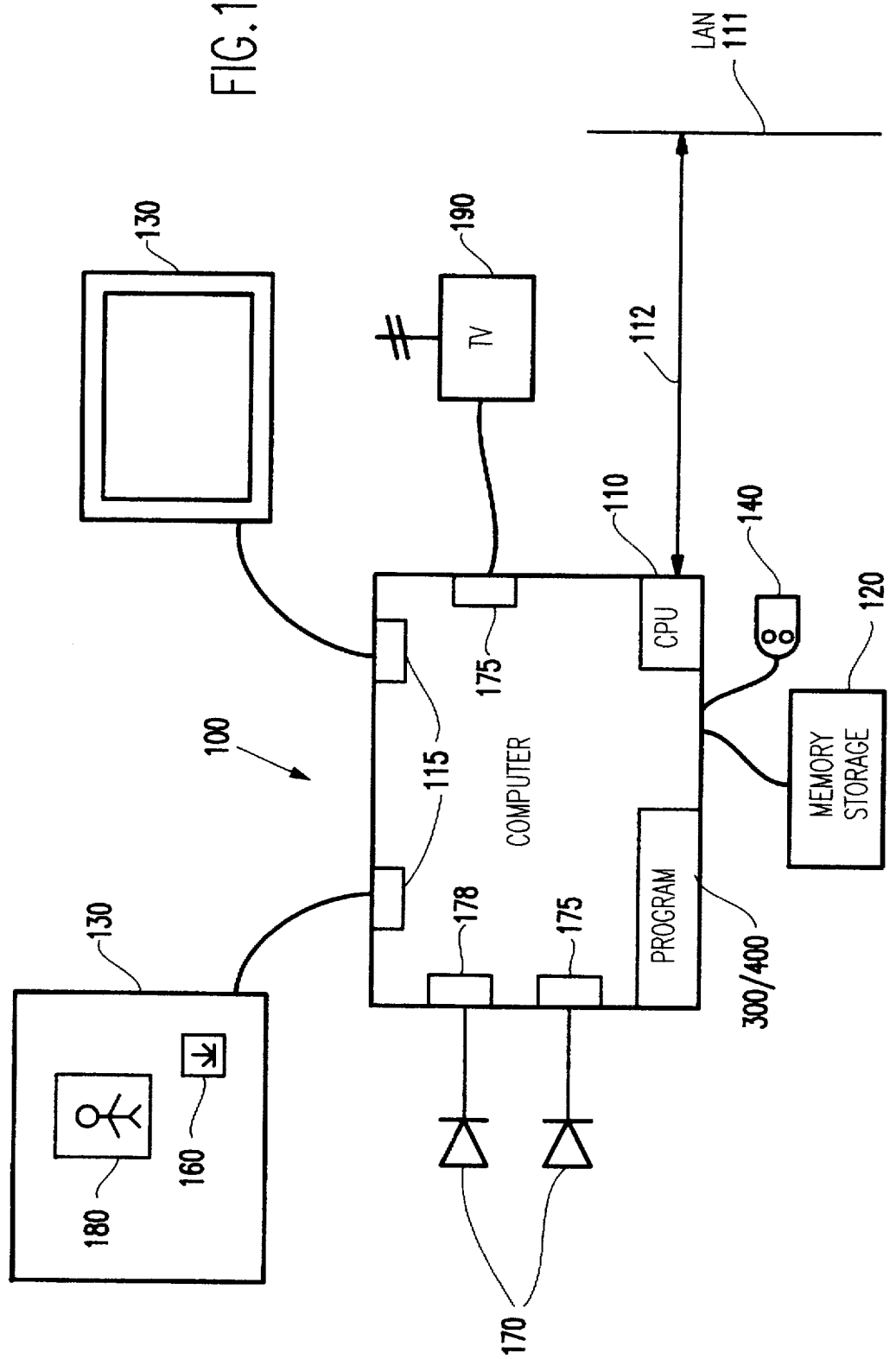
FIG. 1 is a block diagram of the hardware and one preferred embodiment of the present invention.

The present invention is capable of running on any general purpose computer system or microprocessor controlled television, including units which have the ability to present multimedia information. One preferred embodiment is schematically represented in a block diagram in FIG. 1. A computer system 100 comprises a control processing unit (CPU) 110, memory storage device 120, one or more monitors or graphical interfaces 130, and selection device 140 such as a mouse or speech recognition system 178. In one embodiment, a IBM RISC SYSTEM/6000 100 comprises a control processing unit (CPU) 110, memory storage device 120, one or more monitors 130, and a mouse 140. The mouse 140 may be used to select graphical images like icons 160 or windows 180. (Note that graphical images are also referred to as selectable items herein.) On an IBM RISC System/6000 multiple monitors 130 can be controlled by multiple monitor adaptor cards 115 such as the IBM RISC System/6000 Color Graphics Display Adaptor. The computer system 100 may also have audio input/output capability 170. An ActionMedia 11 Display Adapter 175

(described in the IBM ActionMedia 11 Technical Reference) can be used for audio/video playback 170.

This adaptor 175 may also be used to display TV broadcasts/signals 190 and other full motion video and sound audio/visual on the monitors 130.

In addition, speech recognition 178 may be provided (such as the IBM VoiceType Dictation Adapter).

In an alternative embodiment, the CPU 110 can be connected to 112 a client/server network (or LAN 111) to which other target monitors 130 and/or systems 100 are connected.

Systems 100 that can be used to display graphical images, like icons and windows, are well known.

GUIs can be used to control any apparatus having a monitor. In the field of television (TV), channel selection can be affected by selecting an icon consisting of the animated video broadcast on that channel frequency.

Figure 2:
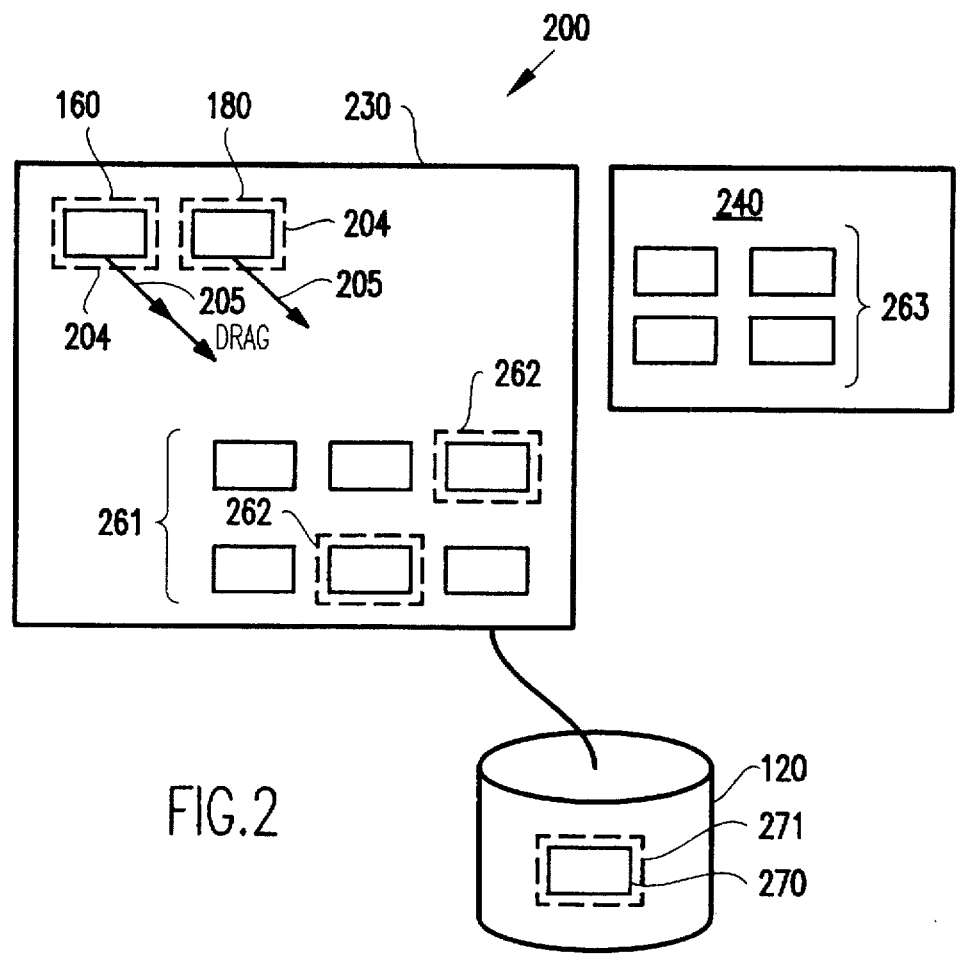
FIG. 2 is a drawing of two monitors with graphical images/selectable items on their graphical interfaces.

FIG. 2 is a block diagram of a system 200 showing graphical images/selectable items (such as icons 160 or windows 180, both which may contain animated images) appearing on a primary monitor 230. A selectable icon 160 or window 180 may be selected 204 and dragged 205 on the primary monitor 230 using a mouse 140 or other selecting device 140.

The following explains the invention using an icon, although the concept applies to other graphical images such as windows. Once an icon 160 is selected 204, certain icons in the set of displayed icons 261 are highlighted 262 (by color changes or other graphical means) if they are related to the icon 160 or can receive the select icon 160 in a drag and drop icon interface. For example, icons 262 may be the only valid "drop sites" for selected icon 160. The relation between icons is defined as described in FIG. 4 below. The set of displayed icons 263 may reside on another monitor 240 connected to the same computer (local) or connected over a computer network (remote).

The relation between icons may be defined by a user profile 271. In a preferred embodiment, this is a "scenario matrix" 270 on the memory storage device 120. This user profile 270, which can exist as a data file, may consist of an array of numbers indicating which icons can receive other icons in a drag-and-drop GUI or which icons are related to one another in a more general GUI.

Figure 3:
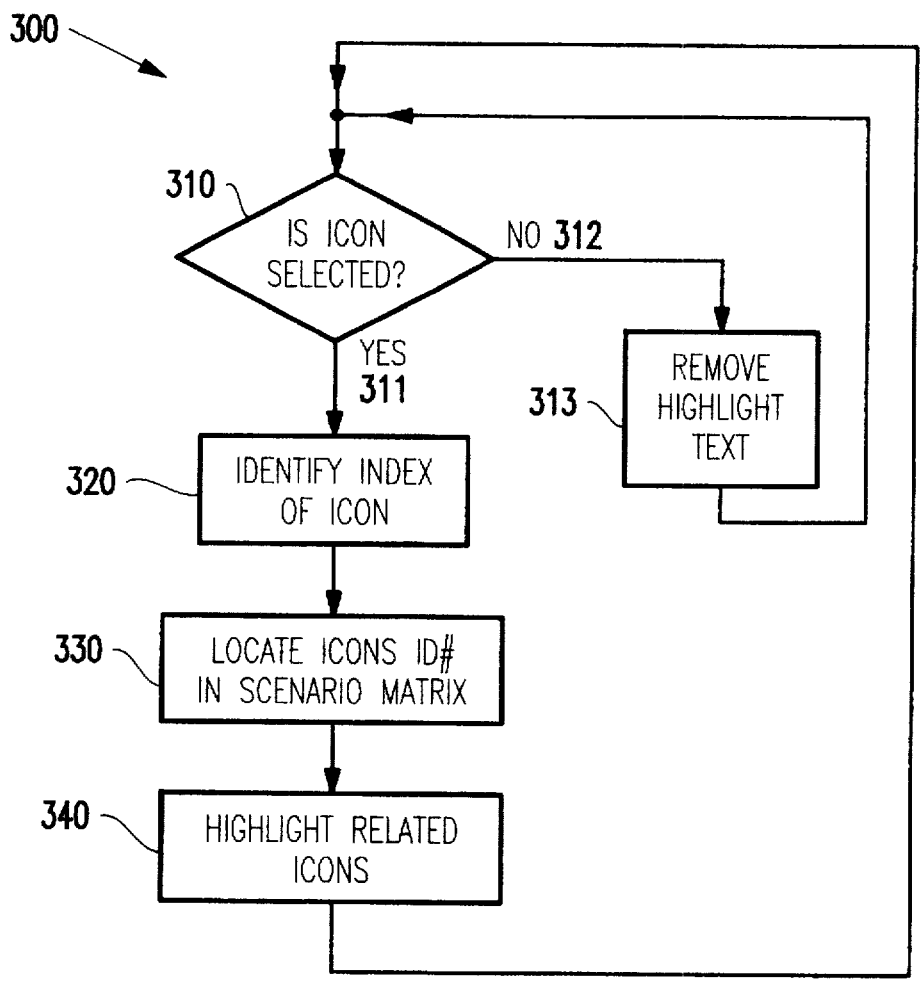
FIG. 3 is a flow chart showing the steps of one preferred method of the present invention.

FIG. 3 is a flow chart showing the steps performed by an icon facilitator program 300 executed by system 100 or 200.

The icon facilitator program 300 first queries 310 if an icon 160 is selected, for example by a mouse-or voice-controlled cursor. Methods for determining if an icon is selected are well known. If the icon 160 is selected 311, the program identifies 320 an icon identifier, like an icon index number, and locates 330 the corresponding entry, a strength value, in the scenario matrix 270 (or user profile 271) which may be stored as a file on medium 120. (An icon index number can be any name that uniquely identifies the icon.) The searching of indices in files containing arrays or records of data is known to those skilled in the art. This file may be updated periodically by application software or the user. (If an icon is added to the GUI, a new entry may be added to the matrix 270.) As a result of step 330, related icons are then highlighted 340. In other words, highlighted icons are those with a relationship with the selected icon, where the relationship is indicated by the strength value corresponding to a pair containing the selected icon and the related icon. Highlighting of icons may be accomplished using routines supplied by any standard window software (See for example. Nye, A. (1988) Xlib Programming Manual.

O'Reilly & Associates: Cebastopol, Calif. which describes color manipulation for the purpose of highlighting). If no icons 312 are selected, all icons are unhighlighted in step 313.

Figure 4:
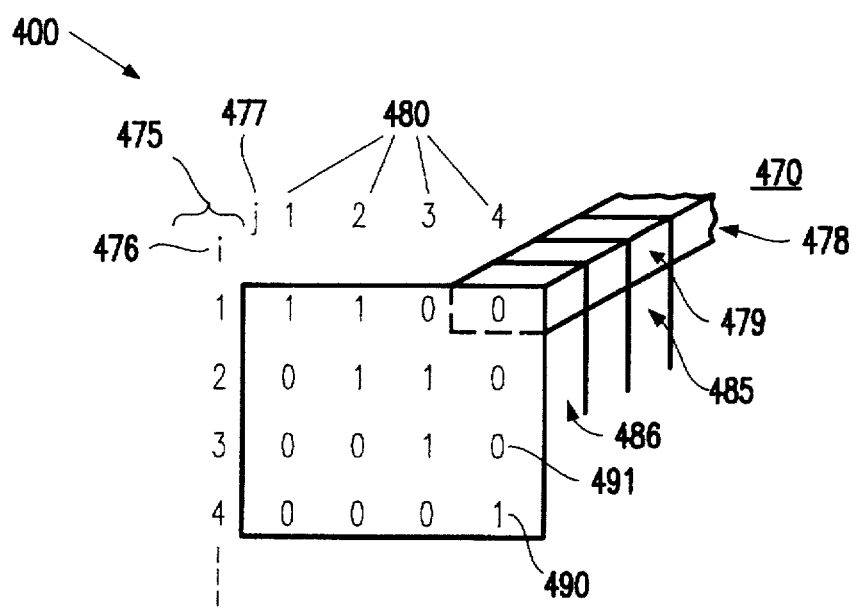
FIG. 4 is a block diagram of a data structure that defines the interrelatedness of icons.

FIG. 4 is a block diagram of one typical preferred data structure 470 that lists alphanumerical indices 475, i 476, for each selectable item 160 and alphanumerical indices 480, j 477, for each of zero or more possible target icons (261, 263). This matrix of numbers 470 is called a scenario matrix, and is used for highlighting related icons when a user selects an icon. The scenario matrix may be a file on disk, or data in memory, with designators, like numbers, typically 490 and 491, indicating which icons are related for the purposes of highlighting relevant target icons.

For example, consider a matrix $A(i,j)$ 470 where i 476 and j 477 are numerical indices denoting various icons. The scenario matrix can be a square and symmetric matrix, i.e. $A(i,j)=A(j,i)$, if all icons i and j are related to each other, for example, if i can be dragged on top of j, and j can be dragged on top of i with a useful result. More generally the matrix is not symmetric if i is related to application j but the reverse is not so. As an example, one may transfer artwork from a drawing program into a word processor application, but one may not import a document from a word processor program into an artwork program.

FIG. 4 shows a binary scenario matrix 270, 470 where highlighting (related icons) is denoted by 1 (490) and non-highlighting (unrelated icons) is denoted by 0 (491). When an icon i 476 is selected 204 or dragged 205, row i 477 of the scenario matrix may be thought of as a control vector which determines which other icons are highlighted, (1=highlight or 0=not-highlight). Therefore, once the i-th icon is selected, the highlighting program 300 examines the i-th row of the matrix.

Icons represented by numerical indices 480 in j entries 477 in this control vector may be distinguished with one or more distinguishing features 262, all of which can be accomplished by known graphical methods in X-windows and other windows environments by one skilled in the art of windows programming. These distinguishing features could be user selectable. Distinguishing features (highlights) might include icon: brightness, outlining, font, shading, color, size, shape, and/or animation. For example, using shape as a distinguishing feature, an icon shape control, known in GUI interface programs, may be employed to change the shape of the icon from one shape, e.g. a rectangle, to another, such as a rounded rectangle or an oval. Using fonts as a distinguishing feature, a three-dimensional style font might be used for the titles of related icons. Also, related icons could be shaded (or not shaded) in the same way as other related icons (and the selected icon). Shading of icons is known in GUI interface programming. Another distinguishing feature is to brighten the related icons, e.g., appropriate target icons (drop sites) 262. See routines supplied by standard window software (see for example, Nye, A. (1988) Xlib Programming Manual. O'Reilly & Associates: Cebastopol, Calif. which describes various ways to implement distinguishing features.) This Xlib Programming Manual is incorporated by reference in its entirety.

In an alternative preferred embodiment, the scenario matrix 470 may be used with a range of values in the matrix. These values, called strength values, could indicate a strength of the relationship between any given pair of icons. For example, the higher the value, the more likely it is that one icon is related to another. A threshold value may be set so that only those icon relations denoted by a sufficiently high value are highlighted. In other words, the strength value between a pair of graphical images must be above a threshold value before the graphical images in the pair are considered to be related. The scenario matrix (470, 270) may be created manually by a user, or created by application software. Additionally, the values, 490 or 491 typically, in the matrix may be provided automatically by a program 400 which monitors a user's past usage and increments values 490 and 491 in the matrix if a user is "likely" to use icons j 477 representing various target applications after using icons 476 representing various selected applications. Other programs 400 could use different criteria to change the strength values in the matrix.

Figure 5:
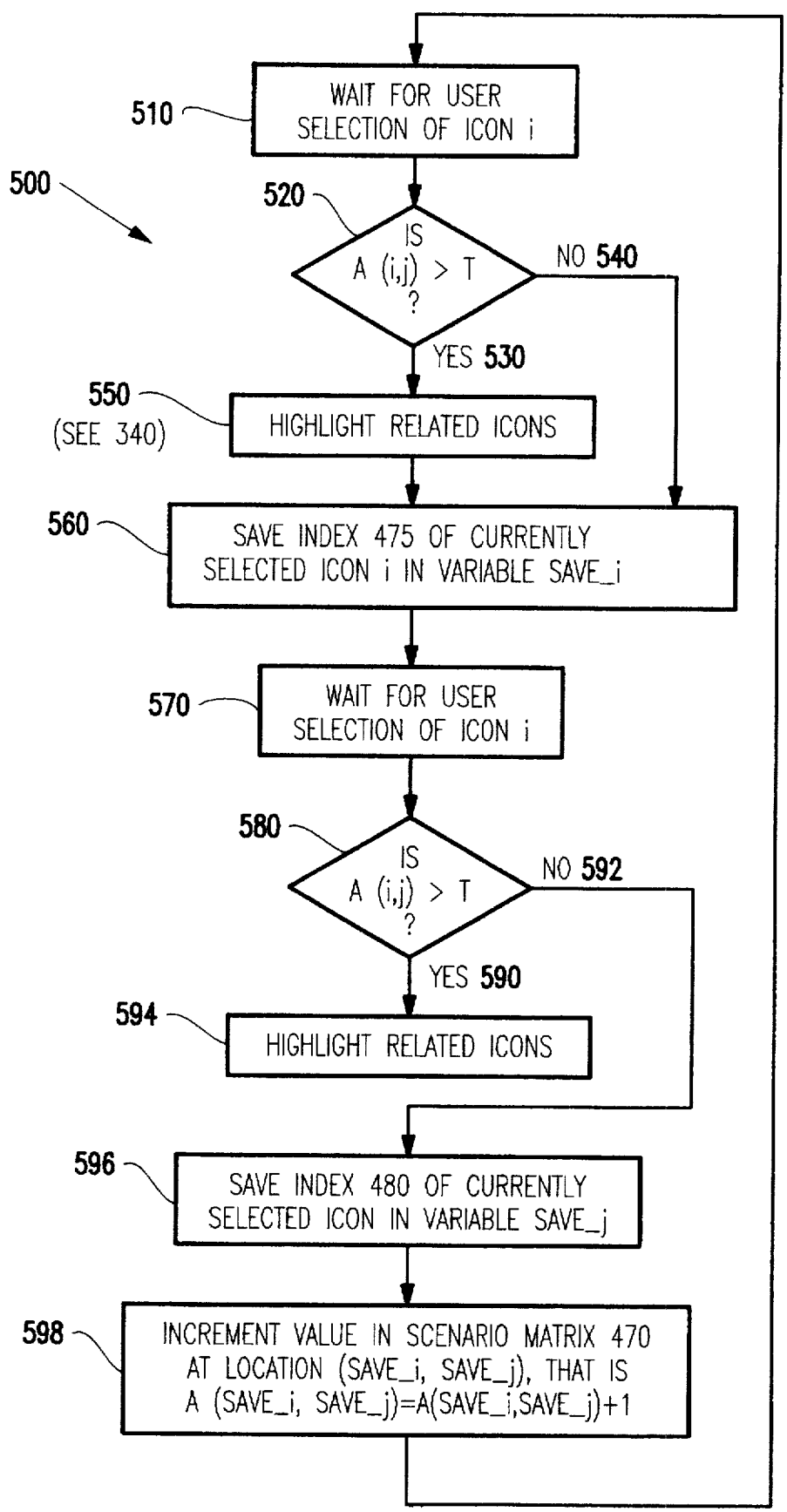
FIG. 5 is a flow chart showing the steps of one preferred method for determining most likely pairs of icons to be used.

For example, FIG. 5 is flow chart indicating how the scenario matrix may evolve as program 400 monitors usage of icons. When the user selects 510 an icon, the program 400 checks 520 to see if the scenario matrix value A(i,j) (490, 491) is greater than a threshold value T. If yes 530 the appropriate icons are highlighted 550 as in 340. If no 540, the icons are not highlighted. The index 475 of the currently selected icon i is saved 560 in a variable called save_i. When the user makes the next selection 570 the program 400 again checks 580 to see if the scenario matrix value A(i,j) is greater than a threshold value T. If yes 590 the appropriate icons are highlighted 594 as in 340. If no 592, the icons are not highlighted. The index 480 of the currently selected icon is saved 596 in a variable called save_j. In step 598, the value A(save_i, save_j) of the scenario matrix 470 is incremented at location (save_i, save_j). In this manner, the scenario matrix reflects "most frequently used pairs" and can therefore highlight target icons 262 most likely to be used in, for example, a drag and drop interface. Here the strength of the relationship between any given pair of icons is determined by the number of times the pair of icons is used together.

Alternatively, the values in the scenario matrix can be normalized by the sum of all the array elements. In this manner, the array value reflects the number of times a pair is selected as a percent of the total number of pair selections.

Using similar methods, "most recently used pairs" may also be cataloged and highlighted. This may be accomplished, for example, by periodically resetting the scenario matrix values 490 and 491 to some default and then letting them accumulate again as in 598. Alternatively, the scenario matrix 470 may be a three-dimensional array, whose third dimension 478 contains values, typically 479, indicating relationships for a period of time. For example, a 2-dimensional array, typically 485, would exist for each of one or more given periods of time. In this preferred embodiment, to determine "most recently used pairs", step 330 locates icons in the 2-dimensional array 485, corresponding to the most recent time period 486 in order to determine which icons have the strongest relation (here most recent) and therefore are highlighted 340. Selection of other time periods, or groups of time periods, can be achieved by specifying specific 2-dimensional arrays 485 or time period ranges.

In addition, the data files 270 containing the scenario matrix 470 can be made portable so that the entire scenario matrix can be moved from machine to machine or otherwise used to customize a machine's GUI for a particular user, or to provide a common "base" scenario matrix for a company or organization. The scenario matrix would be in the form of a data file or shared memory file that can accessed across a LAN, WAN, or other network. For example, in the UNIX operating system, it is standard procedure to access remote file systems via NFS (network file system) protocols. In particular, remote files can be accessible via ioctl() function calls.

Given this disclosure alternative embodiments would become apparent to one skilled in the art.

We claim:

1. A computer system comprising:

a central processing unit and a memory;

one or more graphical interfaces each having two or more graphical images, one of the graphical images being a selected graphical image, one or more of the graphical images being a set of displayed graphical images, and one or more of the displayed graphical images being a related graphical image having a relation with the selected graphical image;

a data structure residing on the computer memory having one or more strength values, each of the strength values indicating a strength of said relation, each pair including the selected graphical image and one related graphical image; and means for changing one or more distinguishing features of a first related graphical image of a first pair of said pairs, depending upon said strength value, when a first selected graphical image of said first pair is selected, wherein said means for changing variably changes said distinguishing features of said related graphical images depending upon an amount of said strength value and performs a first feature change when said strength value exceeds a first value and a second feature change when said strength value exceeds a second value greater than a first value.

2. A computer system as in claim 1, wherein the relation comprises information regarding the related graphical images being drop sites for the selected graphical image.

3. A computer system as in claim 1, wherein the relation comprises information regarding the related graphical images being in a same class as the selected graphical image.

4. A computer system as in claim 1, wherein the relation comprises information regarding one or more related graphical images representing a related program for being used with a selected program represented by the selected graphical image.

5. A computer system as in claim 1, wherein the relation comprises one or more related graphical images representing a related data for being used with a selected program represented by the selected graphical image.

6. A computer system as in claim 1, wherein the distinguishing feature includes one of brightness, outlining, font, shading, color, size, shape, and animation.

7. A computer system as in claim 1, wherein the selected graphical image is selected with a pointing device.

8. A computer system as in claim 1, wherein the selected graphical image is selected with a speech recognition system.

9. A computer system, as in claim 1 wherein the graphical interface comprises a television.

10. A computer system as in claim 1, wherein said strength values are stored in a scenario matrix.

11. A computer system as in claim 10, wherein said scenario matrix comprises one of a two-dimensional scenario matrix and a three-dimensional scenario matrix.

12. A computer system as in claim 1, wherein said means for changing performs a first color change when said strength value exceeds a first value and a second color change when said strength value exceeds a second value greater than a first value.

13. A computer system comprising:

a central processing unit and a memory;

one or more graphical interfaces each having two or more graphical images, one of the graphical images being a selected graphical image, one or more of the graphical images being a set of displayed images, and one or more of the displayed graphical images being a related graphical image having a relation with the selected graphical image;

a data structure, residing on said memory, having one or more strength values, each of the strength values indicating a strength of the relation, each pair including the selected graphical image and one related graphical image; and means for changing one or more distinguishing features of each of a first related graphical image of a first pair of said pairs, depending upon said strength value, when a first selected graphical image of said first pair is selected, wherein said changing means variably changes said distinguishing features of said related graphical images depending upon an amount of said strength value and performs a first feature change when said strength value exceeds a first value and a second feature change when said strength value exceeds a second value greater than a first value.

14. A computer system as in claim 13, wherein each of the related graphical images and said selected graphical image form a pair having a strength value above a threshold.

15. A computer system as in claim 13, wherein one or more of the strength values comprises a number of times the graphical images in a pair are selected as a pair.

16. A computer system as in claim 15, wherein the strength values are determined over a time period.

17. A computer system as in claim 16, wherein the time period comprises a most recent time period.

18. A method of showing a relationship between icons on a graphical interface of a computer system comprising steps of:

selecting a selected graphical image displayed on the graphical interface;

determining a relation between the selected graphical image and one or more related images displayed on the graphical interface, the relation comprising a strength value in a matrix of strength values, each strength value indicating a strength of the relation, each pair including the selected graphical image and related graphical image; and distinguishing the related graphical images by changing a distinguishing characteristic of each of the related graphical images when the selected graphical image is selected, wherein said distinguishing step comprises variably changing said distinguishing characteristics for said related graphical images depending upon an amount of said strength values and performing a first feature change when said strength value exceeds a first value and a second feature change when said strength value exceeds a second value greater than a first value.

19. A computer system comprising:

a central processing unit means and a memory means;

one or more graphical interface means for displaying graphical images, each graphical interface means having two or more graphical images, one of the graphical images being a selected graphical image, one or more of the graphical images being a set of displayed graphical images, and one or more of the displayed images being a related graphical image having a relation with the selected graphical image;

a data structure means, residing on the computer memory means, for defining how the selected graphical image and each of the related graphical images are related; and means for changing one or more distinguishing features of a first related graphical image of a first pair of said pairs, depending upon said strength value, when a first selected graphical image of said first pair is selected, wherein said means for changing variably changes said distinguishing features of said related graphical images depending upon an amount of said strength value and performs a first feature change when said strength value exceeds a first value and a second feature change when said strength value exceeds a second value greater than a first value.

* * * * *